Dec. 5, 1967    H. A. SMITH    3,355,948

SPHERICAL TANK GAUGE

Filed Aug. 26, 1965

INVENTOR
HARVEY A. SMITH
BY Norman Friedland
ATTORNEY

United States Patent Office 3,355,948
Patented Dec. 5, 1967

3,355,948
SPHERICAL TANK GAUGE
Harvey A. Smith, Hampden, Mass., assignor, by mesne assignments, to the United States of America as represented by the Administrator of the National Aeronautics and Space Administration
Filed Aug. 26, 1965, Ser. No. 482,670
4 Claims. (Cl. 73—290)

ABSTRACT OF THE DISCLOSURE

An apparatus for measuring the quantity of liquid in a spherical tank located in a reduced gravity atmosphere including a flexible bladder mounted internally across the tank, and a retractable measuring stick attached to the center of the bladder and extending through an opening in the tank. Circular rigid hoops are mounted on the bladder coaxial with the center line of the tank for stabilizing the bladder and causing it to remain centered in the tank.

---

The invention described herein was made in the performance of work under a NASA contract and is subject to the provision of Section 305 of the National Aeronautics and Space Act of 1958, Public Law 85–568 (72 Stat. 435: USC 2457).

This invention relates to liquid quantity measuring instruments and particularly to a liquid level gauge for a spherical tank which tank is subjected to zero gravity conditions.

Due to the advent of outer space exploration the measurement of liquid in an enclosed container has presented problems in view of the fact that the outer space is a gravity free environment. In any such measuring system it is necessary for the measuring device to be relatively simple, lightweight and be repeatable over a considerable time period.

This invention concerns itself with measuring the quantity of liquid contained in a spherical tank, and is relatively simple inasmuch as the quantity is measured from a position of a bladder. The bladder is preloaded with sufficient force to form the bladder and liquid into a predictable shape such that under zero gravity conditions a readout can be calibrated for various axial bladder locations. Each bladder location has one unique corresponding quantity of liquid.

One of the problems attendant with the use of an unreinforced bladder in a zero gravity environment is that the bladder near the end of its stroke does not completely empty the liquid in the container since the bladder tends to bulge inwardly. This problem is overcome by attaching circular rigid hoops to the bladder such that the bladder touches the bottom of the tank simultaneously with the tank emptying completely due to bladder shaping by the hoops. These hoops have a dual function inasmuch as they tend to stabilize the bladder and cause it to remain on the axial center line of the tank.

It is therefore an object of this invention to provide a liquid level indicator adapted to measure the quantity of liquid of a spherical tank subjected to a nongravitational environment.

A still further object of this invention is to provide, in a liquid level gauge as described, a flexible bladder within a spherical tank and having concentric rigid hoops secured to the bladder in order to stabilize the bladder and cause it to remain on the axial center line of the tank.

A still further object of this invention is to provide a liquid level gauge for a spherical tank as described, which gauge is characterized as relatively simple, accurate and having good repeatability although subjected to a nongravitational environment and also subjected to rugged use.

Other features and advantages will be apparent from the specification and claims and from the accompanying drawings which illustrate an embodiment of the invention.

Figure 1:
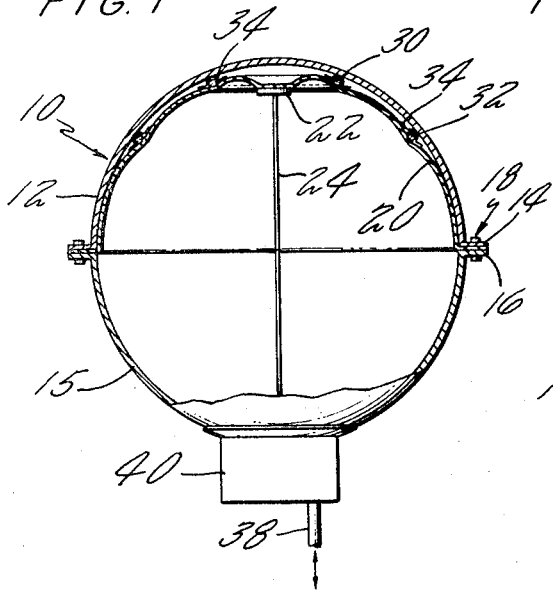
FIGURE 1 is a view partly in schematic and partly in section illustrating the spherical tank when it is substantially filled with liquid.

Referring now specifically to the details of the figures, the spherical tank is shown generally by numeral 10 comprising upper casing member 12 having a radially extending flange 14 and a lower casing 15 having a radially extending flange 16 complementing flange 14. A plurality of openings formed in flanges 14 and 16 are adapted to receive a suitable attaching mechanism such as a nut and bolt assembly generally indicated by numeral 18. The bladder 20, made from a suitable flexible material capable of restraining movement of the liquid but yet flexible enough to contour itself to the particular shape of the liquid but being retained by the hoops to be described hereinbelow, is supported at its outer periphery between the inner surfaces of flanges 16 and 18.

Figure 3:
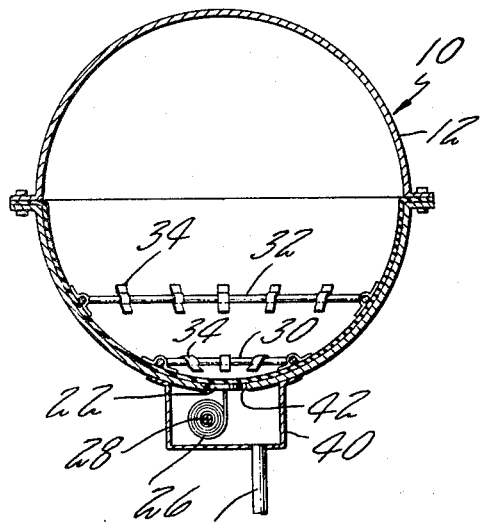
FIGURE 3 is substantially identical to FIGURES 1 and 2 only showing the tank in its empty condition and also illustrating the combined tension and gauge mechanism of this invention.
Figure 4:
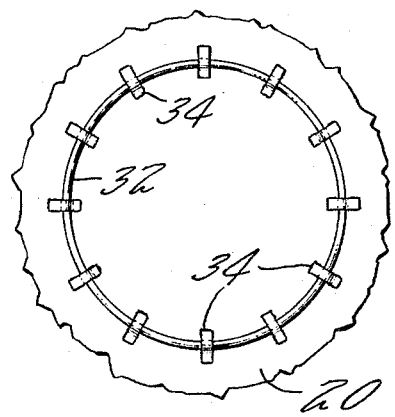
FIGURE 4 is a partial sectional view of the bladder illustrating the attachment of one of the hoops.

Centrally disposed of the bladder 20 is a flat plate-like member 22 suitably secured to the inner surface of the bladder and may be retained thereto by any suitable means. Extending therefrom is a flexible wire 24 which in this instance is the coil of the coil spring generally indicated by numeral 26, suitably supported to shaft 28, more evidenced by viewing FIGURE 3. Judicially secured to the outer surface of the bladder 20 are hoops 30 and 32 which are concentrically mounted relative to the axial axis of the bladder. Thus the hoops 30 and 32 are coaxially mounted relative to the spring 24.

Figure 2:
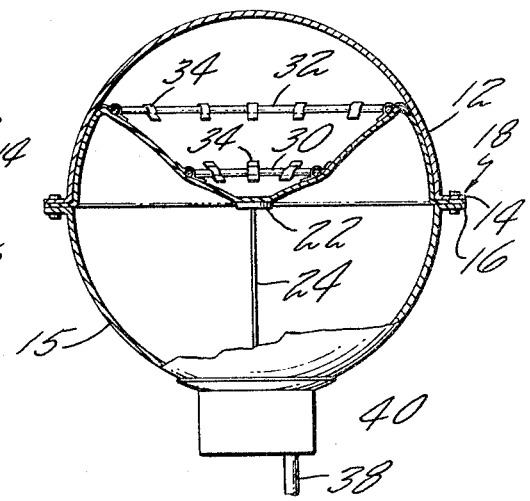
FIGURE 2 is similar to FIGURE 1 only showing the tank partially filled.

As can be viewed from FIGURE 2, showing a partial emptying of the spherical container, the hoops 30 and 32 serve to stabilize the bladder and cause it to remain on the axial center line of the tank. The concentric hoops 30 and 32 are supported to the bladder by suitable fabric retaining tab members 34 which are either cemented or sewn directly to the bladder itself. In the empty position it will be appreciated that the force exerted by spring 26 causes the hoops to abut against the inner wall of the spherical tank which serves to substantially empty liquid out of the tank. Suitable tubing 38 attaching to the spring enclosure member 40 serves to fill and empty the tank through the aperture 42 formed on the bottom of the spherical tank 10. Of course, the means for emptying and releasing liquid from the tank do not form a part of this invention and any departure therefrom would obviously not detract from the scope of this invention.

Figure 5:
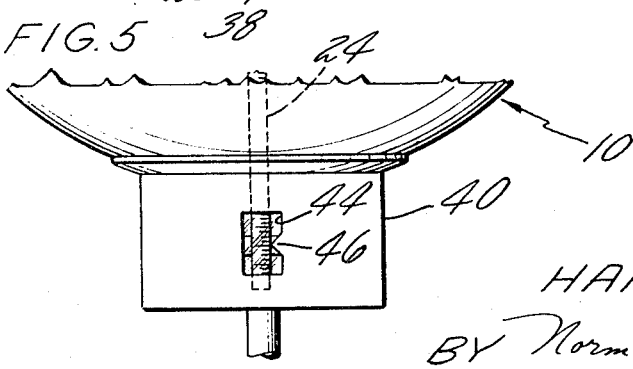
FIGURE 5 is a partial view in elevation indicating the scale for detecting the level of liquid within the spherical chamber.

Shown in FIGURE 5 is the end view of the enclosure member 40 having pointer 46 inscribed on a suitable window indicated by numeral 44. The spring 24 may be graduated according to the displacement thereof so that for a particular displacement of the spring there will be a corresponding quantity of liquid in the tank.

Obviously any method of transducing the displacement to indicate the quantity of liquid is deemed to be within the scope of this invention. For example, the displacement may move a well-known pentiometer which, in turn, would produce a voltage signal indicative of the volume of the liquid remaining in the tank.

What has been shown by this invention is a relatively simple method which measures the position of a bladder which, in turn, indicates the quantity of liquid in a spherical-shaped tank. This gauge has been successfully tested and shown to be efficacious with good repeatability and accuracy. The inclusion of the metallic stabilizing hoops 30 and 32 serve to insure that each bladder location has one unique corresponding quantity of liquid while also providing means for stabilizing the bladder and holding it on the axial center of the tank.

It is to be understood that the invention is not limited to the specific embodiment herein illustrated and described but may be used in other ways without departing from its spirit.

I claim:

1. Means for measuring the volume of fluid contained in a spherically shaped container subjected to a non-gravitational environment comprising a flexible circular shaped bladder extending laterally internally in the container and having its peripheral edge fastened to the inner walls of the container, a plurality of parallel circular rigid hoops of varying diameter secured to the face of the bladder being in coaxial relation to and spaced longitudinally along the axis of the container for stabilizing and centering the bladder as the volume of fluid in the container empties, resilient means centrally attached to the bladder and having one end extending through an opening formed on the bottom of the container for urging the bladder to empty the fluid, a housing supported to the container for enclosing said end of said resilient means, and means for indicating the relative height of the bladder whereby the height of the bladder is indicative of the volume of fluid in the container.

2. Means as defined in claim 1 wherein said resilient means includes a coil spring.

3. Means as defined in claim 2 wherein said indicating means includes a window in said housing mounted to view graduated indicia formed on said coil spring which indicia is indicative of the height of said bladder.

4. Means as defined in claim 1 wherein one face of said bladder is in intimate contact with the fluid in the container and the hoops are mounted on the opposite face of said bladder.

References Cited

UNITED STATES PATENTS

| | | | |
|---|---|---|---|
| 2,637,111 | 5/1953 | McDuff | 73—321 XR |
| 3,044,663 | 7/1962 | Norton et al. | 73—290 XR |
| 3,180,146 | 4/1965 | Hassack | 73—304 |
| 3,298,466 | 1/1967 | Ayers et al. | 92—5 XR |

LOUIS R. PRINCE, *Primary Examiner.*

DAVID SCHONBERG, *Examiner.*

W. HENRY, *Assistant Examiner.*